US007509871B2

(12) United States Patent
Nakano et al.

(10) Patent No.: US 7,509,871 B2
(45) Date of Patent: Mar. 31, 2009

(54) OCCUPANT LOAD SENSOR FOR VEHICLE (75) Inventors: Satohiko Nakano, Chiryu (JP);
Mutsuro Aoyama, Nagoya (JP); Akira Enomoto, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/978,628

(22) Filed: Oct. 30, 2007

(65) Prior Publication Data
US 2008/0134797 A1 Jun. 12, 2008

(30) Foreign Application Priority Data
Oct. 31, 2006 (JP) ............... 2006-296916
Oct. 15, 2007 (JP) ............... 2007-267659

(51) Int. Cl.
*G01B 7/16* (2006.01)
(52) U.S. Cl. ................... 73/781; 73/862.627
(58) Field of Classification Search ........... 73/781, 73/862.61–862.69
See application file for complete search history.

(56) References Cited
U.S. PATENT DOCUMENTS
6,242,701 B1 6/2001 Breed et al.
7,155,981 B2 1/2007 Matsuura et al.
7,189,931 B2 3/2007 Hida et al.
2006/0144630 A1* 7/2006 Breed et al. ............ 180/273
2006/0185446 A1* 8/2006 Speckhart ............ 73/862.391
2008/0036185 A1* 2/2008 Breed ............ 280/734
2008/0098822 A1* 5/2008 Sakamoto et al. ............ 73/781
2008/0098823 A1* 5/2008 Sumi et al. ............ 73/781
2008/0127752 A1* 6/2008 Nakano et al. ......... 73/862.627
2008/0156103 A1* 7/2008 Nakano et al. ............ 73/781

FOREIGN PATENT DOCUMENTS
JP 2003-83707 A 3/2003
JP 2004-069535 A1 8/2004
JP 2004-286620 A 10/2004
WO WO 2005/080931 9/2005
WO WO 2006/011597 2/2006

* cited by examiner

*Primary Examiner*—Max Noori
(74) *Attorney, Agent, or Firm*—Buchanan Ingersoll & Rooney PC (57) ABSTRACT An occupant load sensor for a vehicle includes a strain member, a connecting member fixed at the strain member, a strain gauge attached to the strain member, an upper bracket having a fixed portion and an attachment portion connecting each fixed portion and extending at a side of the strain member in a lateral direction of the seat, an amplifier case attached to the attachment portion and arranged in parallel with the strain member, an amplifier substrate enclosed in the amplifier case and placed on an identical plane to the strain member, an FPC substrate connected to the strain gauge and the amplifier substrate, a coating portion for coating a connection portion between the FPC substrate and the strain gauge; and a low pressure molded portion molded with a hot melt resin by low pressure molding in the amplifier case to cover the amplifier substrate and the connection portion.

6 Claims, 7 Drawing Sheets

OCCUPANT LOAD SENSOR FOR VEHICLE

CROSS REFERENCE TO RELATED APPLICATIONS

This application is based on and claims priority under 35 U.S.C §119 with respect to Japanese Patent Application 2006-296916, filed on Oct. 31, 2006 and Japanese Patent Application 2007-267659, filed on Oct. 15, 2007, the entire content of which is incorporated herein by reference.

FIELD OF THE INVENTION

This invention relates to an occupant load sensor measuring a load of an occupant seated on a vehicle seat.

BACKGROUND

In JP 2003-83707A, a strain sensor is disclosed. In the strain sensor, an external force is applied to a detecting member pressed into a detecting hole of a sensor substrate (strain member) and a reaction force is applied to first and second fixing members respectively pressed into first and second fixing holes disposed at both sides of the detecting hole. First and fourth strain detecting elements are provided between the detecting hole and the first fixing hole and second and third strain detecting elements are provided between the detecting hole and the second fixing hole. The strain detecting elements are connected by a circuit pattern to structure a bridge circuit and the output from the bridge circuit is amplified by an integrated circuit provided at an upper surface of the sensor substrate to output the amplified output to an exterior portion from an external output electrode provided together with an external power electrode and an external GND electrode at an end portion of the sensor substrate.

In JP2004-268620A, an occupant load sensor, which is interposed between a floor side fixing member and a seat side fixing member for measuring a load of an occupant seated on a seat, is disclosed. This occupant load sensor is structured by a flange portion, a bolt portion, and sensors. The flange portion is mounted to the floor side fixing member contacting a surface of the floor side fixing member. The bolt portion is in contact with the flange portion and protrudes in a vertical direction to be fixed to the seat fixing member with a nut. The sensors are attached to a strain portion provided at a connection portion, which connects the flange portion to the bolt portion, and detect a load applied in an axial direction. A signal line is connected to the sensors via a terminal box.

The stain sensor disclosed in JP 2003-83707A detects the load with strain of the sensor substrate and thus the measurable range of the load is limited. Therefore, it is not possible to interpose the strain sensor between the floor side fixing member, which secures the seat to the vehicle floor, and the seat side fixing member. Also, it is necessary to enclose the entire sensor substrate in a case in order to protect the sensor substrate, the first to fourth strain detecting elements, a circuit pattern, an integrated circuit and the like.

In the occupant load sensor disclosed in JP2004-268620A, the sensors are connected to the amplifier, which is located at another position, with the signal line via the terminal box. Thus, it is not possible to amplify the output of the sensors in the vicinity of the occupant load sensor.

A need exists for an occupant load sensor for a vehicle which is not susceptible to the drawback mentioned above.

SUMMARY OF THE INVENTION

According to an aspect of the present invention, an occupant load sensor for a vehicle includes a strain member adapted to be fixed at both ends at a fixing surface provided at one of a floor side fixing member and a seat side fixing member with a predetermined distance from the fixing surface in a vertical direction of a seat, a connecting member vertically fixed at a center of the strain member, the connecting member adapted to be fixed at the other one of the floor side fixing member and the seat side fixing member, a strain gauge attached to a surface of the strain member between each of the ends and the center of the strain member, an upper bracket having a fixed portion at each end thereof fixed to a back surface of the strain member at the both end and an attachment portion connecting the each fixed portion and extending at a side of the strain member in a lateral direction of the seat, an amplifier case attached to the attachment portion of the upper bracket and arranged in parallel with the strain member, an amplifier substrate enclosed in the amplifier case and placed on an identical plane to the surface of the strain member for amplifying a signal transmitted from the strain gauge, an FPC substrate connected to the strain gauge between each of the end and the center of the strain member and connected to the amplifier substrate, a coating portion made of resin for coating a connection portion between the FPC substrate and the strain gauge, and a low pressure molded portion made of resin, the low pressure molded portion molded with a hot melt resin by low pressure molding in the amplifier case so as to cover the amplifier substrate and the connection portion between the FPC substrate and the strain gauge.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
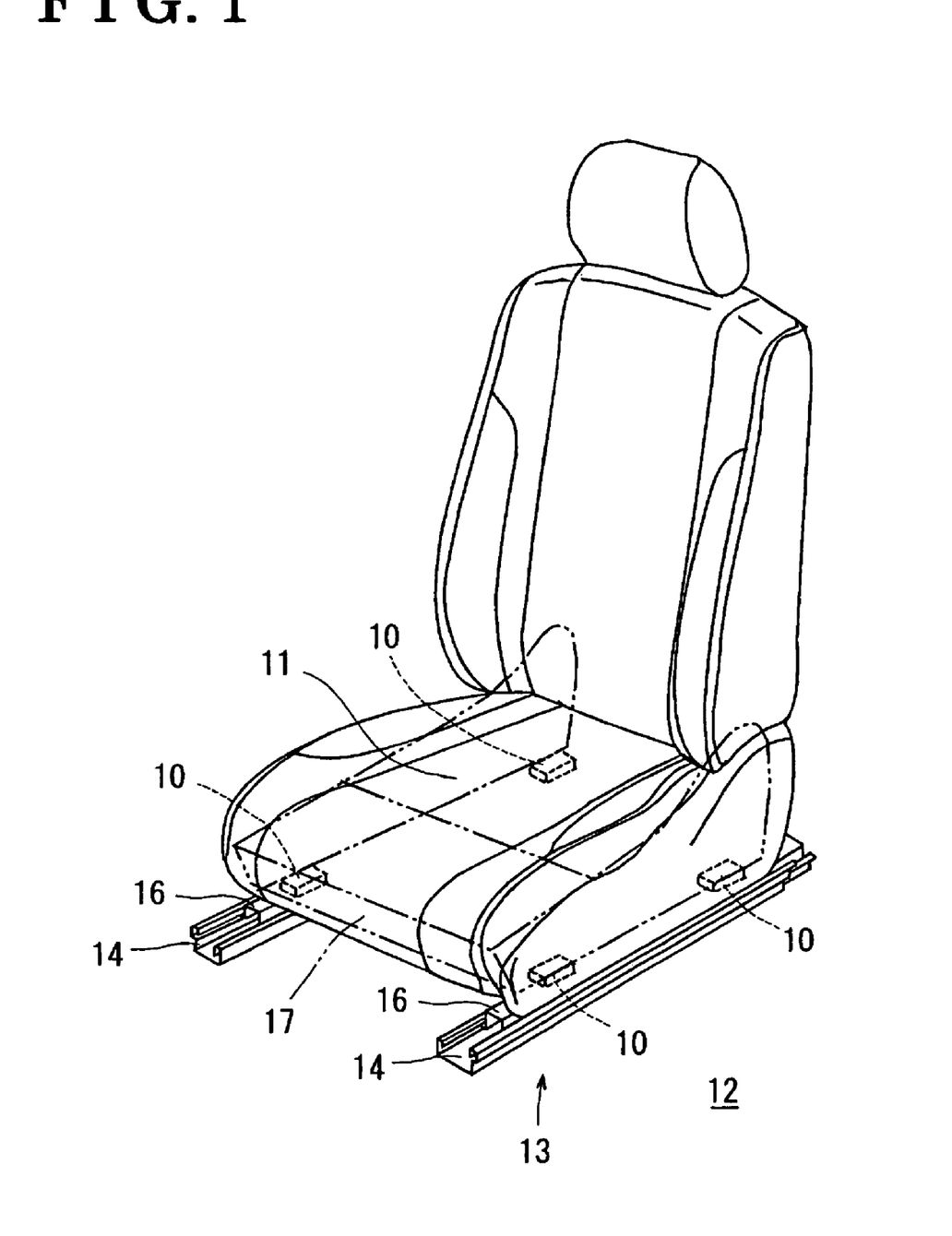
FIG. 1 is a perspective view illustrating a seat applied with an occupant load sensor for a vehicle according to an embodiment.

Described below are occupant load sensors 10 of a vehicle seat 11 according to an embodiment of the present invention, with reference to the attached drawings. The occupant load sensor 10 is configured to measure a load of an occupant seated on the seat 11 illustrated in FIG. 1. A seat sliding apparatus 13 illustrated in FIG. 1 is configured to adjustably secure the seat 11 to a vehicle floor 12. The seat sliding apparatus 13 includes: a pair of lower rails 14 fixedly mounted on the floor 12 and extending in a longitudinal direction of the vehicle; and a pair of upper rails 16 slidably supported by the lower rails 14. A lower portion of the seat 11 is structured with a frame 17 (seat side fixing member) attached to a lower surface of a seat cushion. Among the four corners of the lower surface of the frame 17, two of the corners arranged in the longitudinal direction are fixed to fixing surfaces 18, which are formed at an upper surface of one of the upper rails 16 (floor side fixing member), via the occupant load sensors 10. Other two of the four corners arranged in the longitudinal direction are fixed to fixing surfaces 18, which are formed at an upper surface of the other one of the upper rails 16, via the occupant load sensors 10. A pair of fixed shafts 19 is arranged with a predetermined distance therebetween at each end of each upper rail 16, an end where the occupant load sensor 10 is located. The fixed shafts 19 protrude vertically upwardly at each end of each upper rail 16, so that the corresponding occupant load sensor 10 is fixedly mounted on the fixing surface 18.

Figure 3:
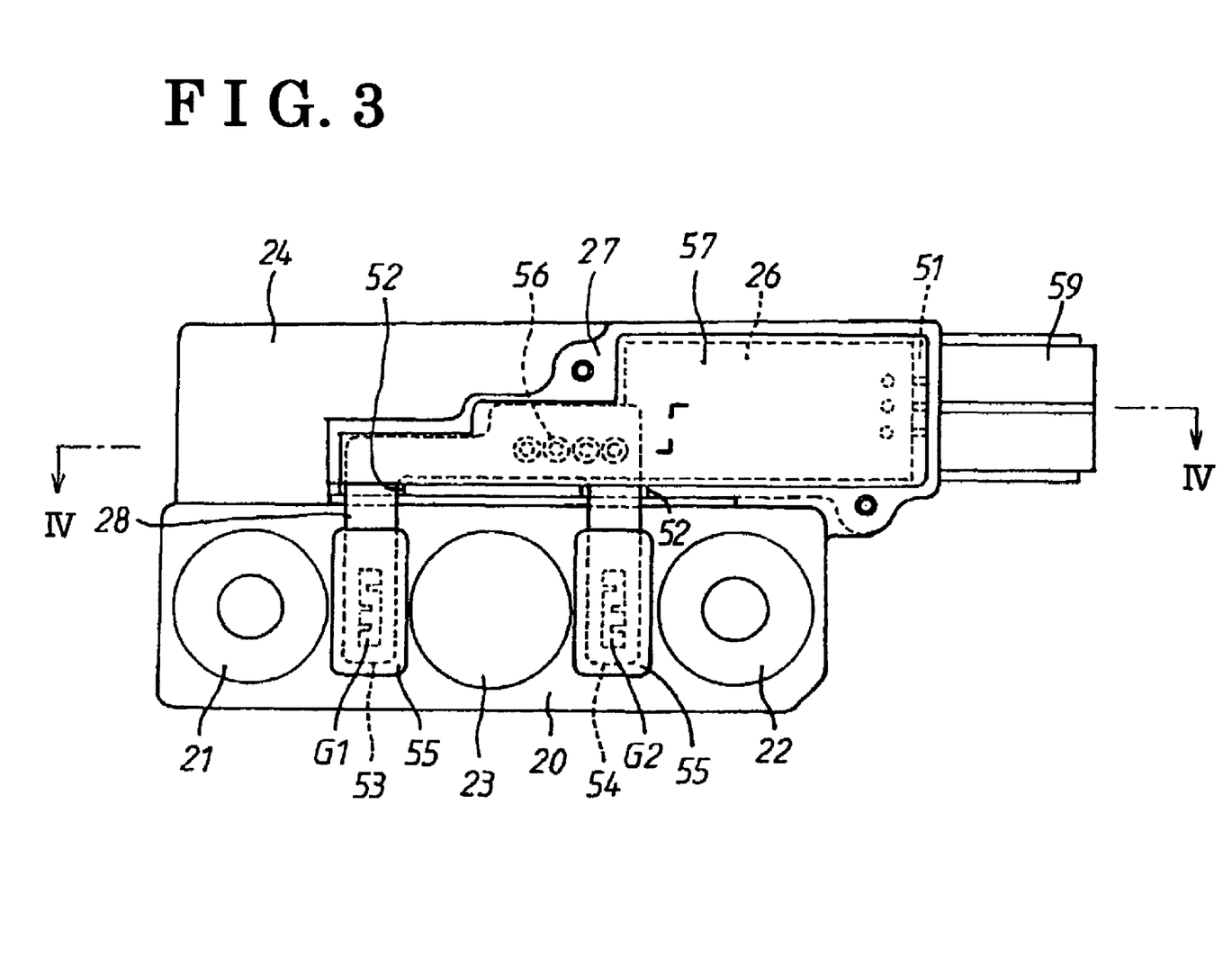
FIG. 3 is a front view illustrating the occupant load sensor.
Figure 4:
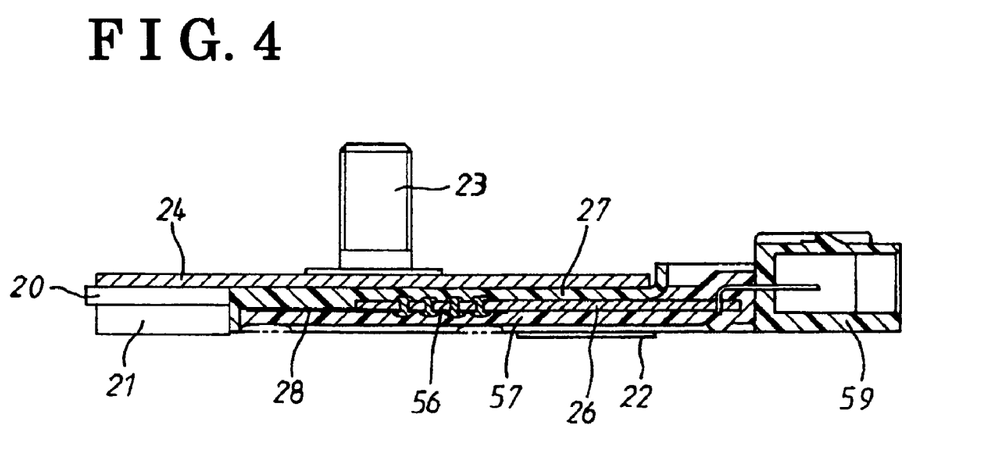
FIG. 4 is a sectional view taken along a line IV-IV of FIG. 3.
Figure 5:
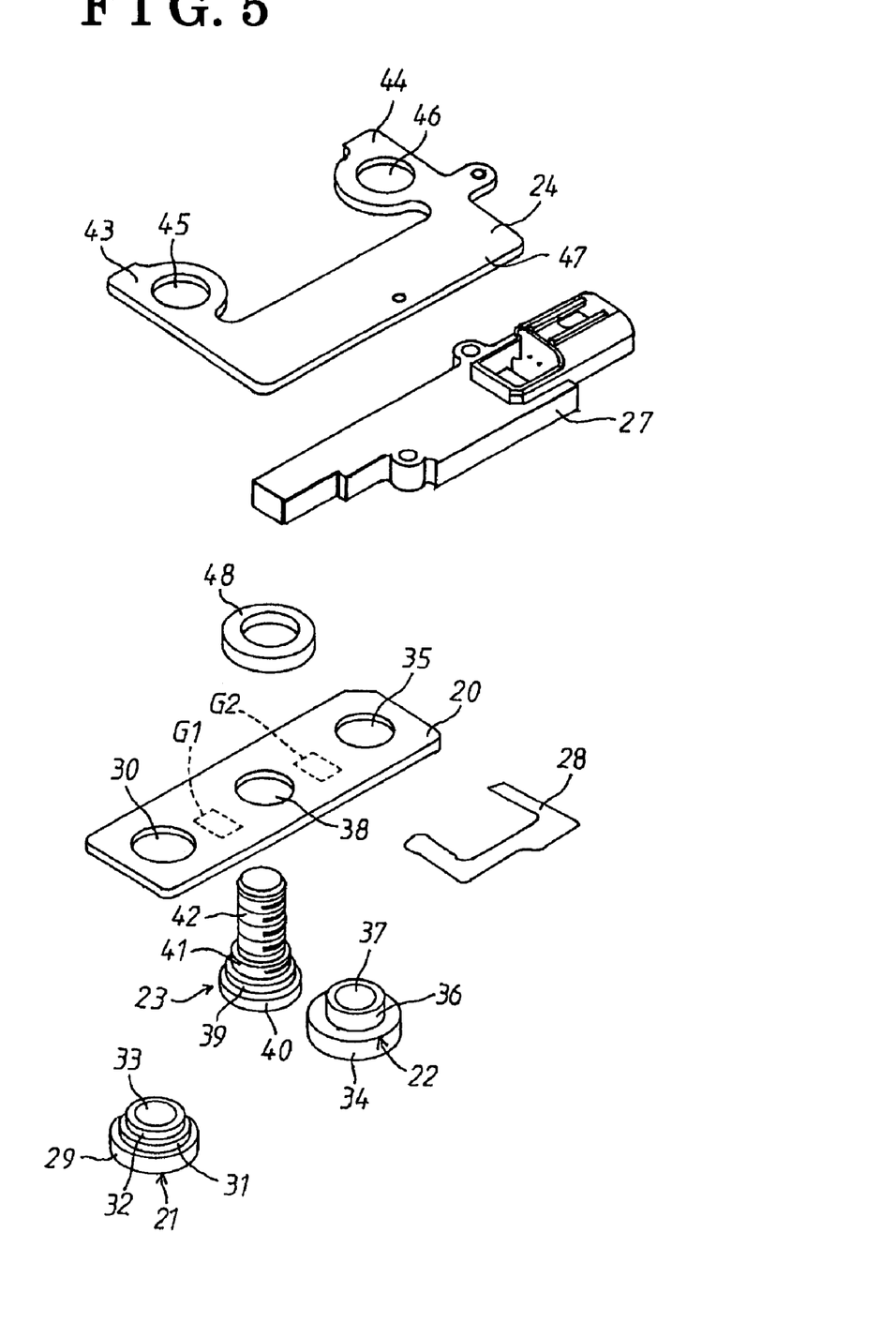
FIG. 5 is an exploded view of the occupant load sensor.

As illustrated in FIGS. 3 and 5, each occupant load sensor 10 includes: a strain member 20; strain gauges G1, G2 attached to a surface of the strain member 20; first and second lower brackets 21, 22 securing the strain member 20 at its both ends to the corresponding fixing surface 18 of the lower rail 16; and a connecting shaft (connecting member) 23 fixed at the center of the strain member 20 and protruding vertically from the strain member 20. The connecting shaft 23 is fly attached to the frame 17 of the seat 11. Each occupant load sensor 10 further includes: an upper bracket 24 serving as a bracket firmly mounted on the upper surface of the strain member 20 at its both ends; an amplifier case 27 attached to an attachment portion 47 of the upper bracket 24 being arranged in parallel with the strain member 20 and enclosing an amplifier substrate 26 for amplifying a signal transmitted from the strain gauges G1, G2; and an FPC substrate 28 connected to the strain gauges G1, G2 and to the amplifier substrate 26.

Figure 6:
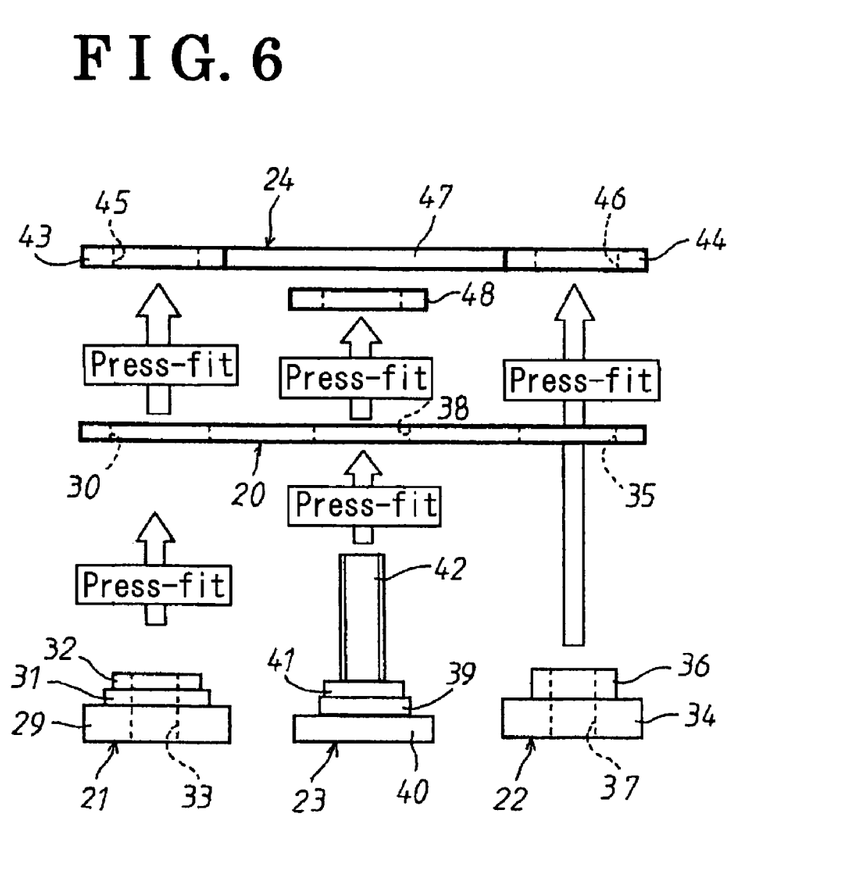
FIG. 6 is a view illustrating how each bracket and a connecting shaft are assembled to a strain member.

As illustrated in FIGS. 5 and 6, the first lower bracket 21 is structured with: a base portion 29 having a predetermined thickness in the vertical direction; an intermediate shaft portion 31 (shaft portion) protruding from the base portion 29 upwardly and pressed into a hole 30 defined at one end of the strain member 20; an upper shaft portion 32 (shaft portion) protruding from the intermediate shaft portion 31 upwardly; and an attachment hole 33 defined at the center of the first lower bracket 21 and penetrating therethrough. The second lower bracket 22 is structured with: a base portion 34 having a predetermined thickness in the vertical direction; a shaft portion 36 (shaft portion) protruding from the base portion 34 upwardly and loosely inserted into a hole 35 defined at the other end of the strain member 20; and an attachment hole 37 defined at the center of the second lower bracket 22 and penetrating therethrough.

The hole 30 and the hole 35 are formed at both ends of the strain member 20 with the same distance as the distance of each pair of fixed shafts 19. In case where the first and second lower brackets 21, 22 are fitted into the strain member 20, the base portion 29 of the first lower bracket 21 and the base portion 34 of the second lower bracket 22 come in contact with the lower surface of the strain member 20. In this case, the intermediate shaft portion 31 of the first lower bracket 21 is press-fitted into the hole 30 of the strain member 20, while the shaft portion 36 of the second lower bracket 22 is loosely inserted into the hole 35 of the strain member 20. The strain member 20 is further formed, at its center, with an intermediate hole 38, into which an intermediate shaft portion 39 of the connecting shaft 23 is press-fitted. The connecting shaft 23 includes, at its end, a flange portion 40 having a smaller thickness than the thicknesses of the base portions 29, 34 of the first and second lower brackets 21, 22. The flange portion 40 of the connecting shaft 23 comes in contact with the lower surface of the strain member 20 when the connecting shaft 23 is press-fitted into the intermediate hole 38 of the strain member 20. The connecting shaft 23 further includes an upper shaft portion 41 protruding from the upper surface of the intermediate shaft portion 39, and a fixed screw portion 42 protruding from the upper surface of the upper shaft portion 41. The upper shaft portion 41 of the connecting shaft 23 is press-fitted into a center bracket 48 in a state where the intermediate shaft portion 39 of the connecting shaft 23 is press-fitted into the intermediate hole 38 of the strain member 20. So configured, the connecting shaft 23 is firmly attached to the strain member 20 at its base portion while the strain member 20 is being interposed between the flange 40 of the connecting shaft 23 and the center bracket 48.

When the load of the occupant seated on the seat 11 is applied to the strain member 20 via the connecting shaft 23, the strain member 20 is flexibly bent while being supported at both ends by the first and second lower brackets 21, 22. Therefore, at each area between the connecting shaft 23 and each first and second lower bracket 21, 22 on the surface of the strain member 20, compressive strain are generated at the sides of the first and second brackets 21, 22, and tensile strain are generated at the sides of the connecting shaft 23. Degrees of the compressive strain and the tensile strain are in proportion to the load of the occupant applied to the strain member 20. In order to detect the compressive strain and the tensile strain, the strain gauges G1, G2 are respectively attached to the areas between the central portion of the strain member 20 and both ends of the strain member 20, i.e., to the areas between the connecting shaft 23 and the first and second lower brackets, 21, 22, Each strain gauge G1, G2 incorporates therein two elements configuring half-bridges, and a full-bridge is configured with each half-bridge of the strain gauges G1, G2. Accordingly, strain or deflection of the strain member 20 is measured as a load of an occupant seated on the seat 11.

Fixed portions 43, 44 of the upper bracket 24 are fixed to a back surface of the strain member 20 at the both ends of the strain member 20. The upper bracket 24 is provided with the fixed portions 43, 44 at both ends, at which fixed through-holes 45, 46 are formed respectively. The upper shaft 32 of the first lower bracket 21 is press-fitted into the fixed through-hole 45. The shaft portion 36 is press-fitted into the fixed through-hole 46. The strain member 20 is hence supportively interposed at its both ends between the fixed portions 43, 44 of the upper bracket 24 and the base portions 29, 34 of the lower brackets 21, 22. The upper bracket 24 is formed with the attachment portion 47 connecting the fixed portions 43, 44. The attachment portion 47 extends at a side of the strain member 20 in a lateral direction of the seat 11. As described above, because the strain member 20 overlaps the fixed portions 43, 44 of the upper bracket 24 but does not overlap the attachment portion 47 of the upper bracket 24, the upper bracket 24 does not influence the flexible deformation of the strain member 20. Therefore, it is possible to measure precisely the load (weight) of the occupant.

The attachment portion 47 of the upper bracket 24 is firmly fixed with the amplifier case 27, which is made of resin, by a screw (not illustrated). In this case, the amplifier case 27 is arranged at the side of the strain member 20 in parallel thereto. The resin for the amplifier case 27 is more lightweight and economical than materials used for a conventional case, thereby leading to a weight and cost saving amplifier case.

The amplifier substrate 26, which is used for amplifying the signal transmitted from the strain gauges G1, G2, is enclosed in the amplifier case 27 so as to be positioned at an identical plane to a surface of the strain member 20, to which the strain gauges G1, G2 are attached. The amplifier case 27 is provided with a connector 59 that establishes a communication line/path for transmitting an output of the amplifier substrate 26 to a non-illustrated electronic control unit.

As illustrated in FIG. 3, the FPC substrate 28 shaped into a U shaped is connected to the strain gauge G1 at its leg between one end, and the center, of the strain member 20 and is further connected to the strain gauge G2 at its another leg between the other end, and the center, of the strain member 20. Further, the FPC substrate is connected to terminals of the amplifier substrate 26 at its back portion. The two legs of the FPC substrate 28, which are connected to the amplifier substrate 26 positioned at the identical plane to the surface of the strain member 20, are connected to the strain gauges G1, G2 attached to the strain member 20 via two recessed portions 52. The recess portions 52 are formed on a side wall of a substrate chamber 51 of the amplifier case 27 enclosing the amplifier substrate 26. Thus, the FPC substrate 28 is easily soldered to the strain gauges G1, G2 and the terminals of the amplifier substrate 26 in the substantially identical plane without being deformed.

Figure 7:
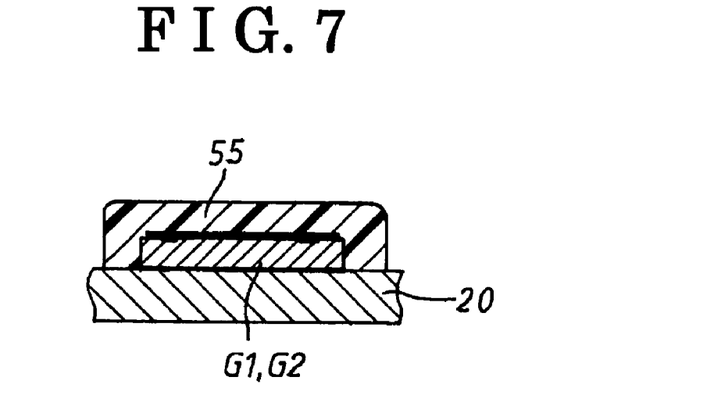
FIG. 7 is a view illustrating a coating state in which strain gauges attached to the strain member are coated with a hot melt resin.

A connection portion 53 connects the leg of the FPC substrate 28 to the strain gauge G1 and a connection portion 54 connects the leg of the FPC substrate to the strain gauge G2. As illustrated in FIGS. 3 and 7, the connection portions 53 and 54 are coated by hot melt coating using a resin such as polyamide or polyester resin and are respectively covered by a coating portion 55. In the substrate chamber 51 of the amplifier case 27, a hot melt resin such as polyamide or polyester resin is molded by low pressure molding so that a low pressure molded portion 57, which is made of resin, covers the amplifier substrate 26 and a connecting portion 56, which connect the back portion of the FPC substrate 28 and the terminals of the amplifier substrate 26. The above-described configuration allows the FPC substrate 28 to be easily connected to the strain gauges G1, G2, which are attached to the strain member 20, and the amplifier substrate 26 in the substantially identical plane without being deformed. Further, the configuration allows the hot melt resin to be easily molded by the low pressure molding in the amplifier case 27. As a result, the connection portions 53 and 54; which respectively connect the FPC substrate 28 to the strain gauges G1, G2, are covered at precise positions and in appropriate sizes by the hot melt coating using the resin. Additionally, the connecting portion 56, which connects the back portion of the FPC substrate 28 and the terminals of the amplifier substrate 26, and the amplifier substrate 26 are covered maintaining a precise positional relationship with respect to the portions coated by the hot melt resin.

A part of each leg of the FPC substrate 28 is exposed between the resin coating portion 55 and the low pressure molded portion 57, and the exposed portion thereof is precisely kept at the length that the FPC substrate 28 does not influence deformation of the strain gauge 20 by the above-described configuration. Therefore, it is possible to precisely measure the load of the occupant. Further, the amplifier case 27 is made of resin, and the connection portions 53 and 54, which connects the FPC substrate 28 with the strain gauges G1, G2, are coated by the hot melt coating. In addition, the hot melt resin is molded in the amplifier case 27 by the low pressure molding so as to cover the connecting portion 56, which connect the FPC substrate 28 to the amplifier substrate 26, and the amplifier substrate 26.

Thus, the cover is not necessary for covering the substrate chamber 51 of the amplifier case 27. Therefore, each connection portion 53, 54 and the connecting portion 56 are protected with a lightweight and inexpensive structure.

Figure 8:
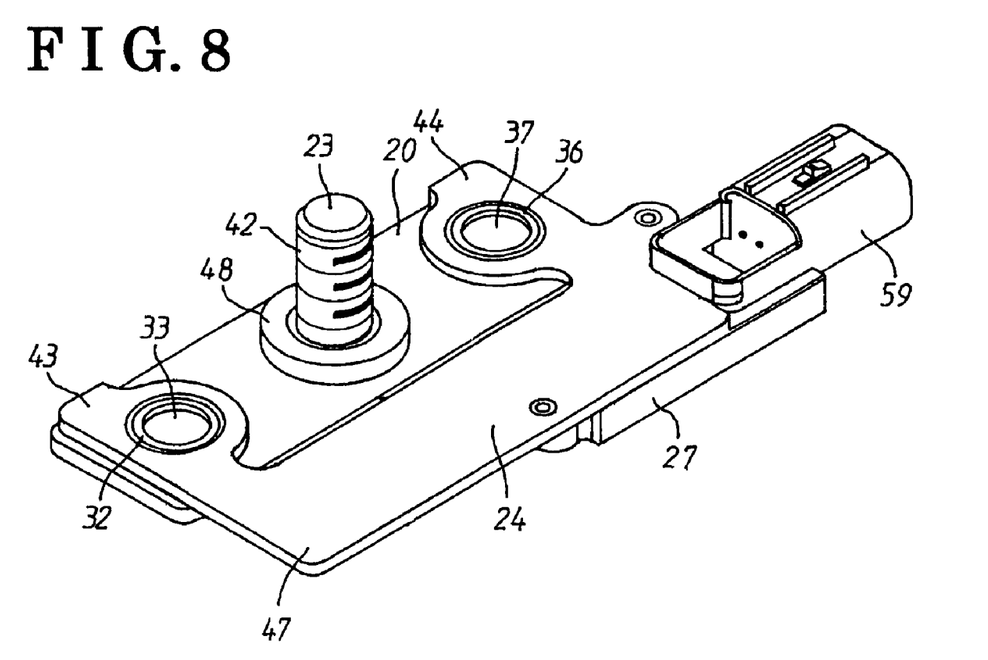
FIG. 8 is a perspective view of the assembled; occupant load sensor.

Next, the mounting of the assembled occupant load sensors 10 illustrated in FIG. 8 will be described. The occupant load sensors 10 are mounted at the four corners of the lower surface of the seat 11, and each occupant load sensor is interposed between the upper rail 16 of the seat sliding apparatus 13 and the frame 17 of the seat 11. The occupant load sensors 10 are mounted so as to meet the following conditions: the strain member 20 is interposed between the upper rail 16 and the frame 17; the amplifier case 27 is placed at an inner side of the upper rail 16 and the connector 59 faces the electronic control unit fixed to the floor 12 at the lower side of an intermediate portion of the seat 11. Each occupant load sensors 10 is mounted between the upper rail 16 and the frame 17 at the four corners in a similar manner, thus the description will be provided about the one occupant load sensor 10 mounted at the one corner. However, in order to mount the occupant load sensors 10 as described above, the arrangement of the amplifier case 27 relative to the strain member 20 should be different between the left and right sides of the seat 11, also should be different between the front and rear sides of the seat 11. The occupant load sensor 10 located at the left front side of the seat 11 has an identical arrangement to that of the one located at the right rear side of the scat 11, and the occupant load sensor 10 located at the left rear side of the seat 11 has an identical arrangement to that of the one located at the right front of the seat 11. Thus, two types of the load occupant sensor 10, which are mountable to either the left side or the right side of the seat 11, are necessary.

Figure 2:
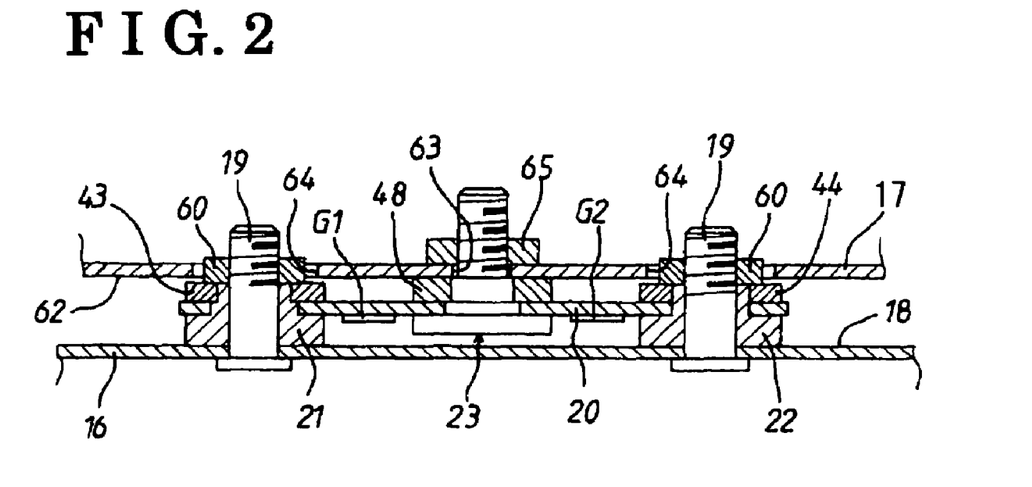
FIG. 2 is a sectional view illustrating an assembled state of the occupant load sensor to a frame of the seat.

As illustrated in FIG. 2, the pair of the fixed shafts 19 which vertically protrudes from each end portion of each upper rail 16, and one fixed shaft 19 is fitted into the attachment hole 33 of the first lower bracket 21 and the other fixed shaft 19 is fitted into the attachment hole 37 of the second lower bracket 22. Bottom surfaces of the base portions 29, 34 are seated on the fixing surface 18. A nut 60 is threaded to a threaded portion cut into a distal end of each fixed shaft 19. The nuts 60 press the fixed portion 43, 44 of the upper bracket 24 and thereby securing the strain member 20 of the occupant load sensor 10 to the fixing surface 18 of the upper rail 16 at both ends thereof with the predetermined distance from the fixing surface 18.

A connecting surface 62 is formed at the frame 17 of the seat 11 and the connecting hole 63 is defined at the connecting surface 62. The fixed screw portion 42 of the connecting shaft 23 is fitted into the connecting hole 63, and a lower surface of the connecting surface 62 comes in contact with an upper surface of the center bracket 48. Consequently, the frame 17 is placed on the upper frame 16 via the strain member 20. A nut 65 threaded to the fixed screw portion 42 presses the connecting surface 62 into the center bracket 48, thereby fixing the connecting shaft 23 of the occupant load sensor 10 to the frame 17 of the seat 11. At this time, the amplifier case 27 is located away from the upper rail 16 and the frame 17 in a lateral direction of the seat 11, thus it is possible to shorten the distance between the strain gauges G1, G2 attached to the strain member 20 and the amplifier substrate 26 enclosed in the amplifier case 27 and to reduce the distance between the upper rail 16 and the frame 17.

In the above-described embodiment, the first and second lower brackets 21, 22 are fixed to the upper rail 16 and the connecting shaft 23 is fixed to the frame 17. However, the first and second lower brackets 21, 22 may be fixed to the frame 17 and the connecting shaft 23 may be fixed to the upper rail 16.

In the above-described embodiment, the connection portions 53, 54 connecting the FPC substrate 28 and the strain gauges G1, G2 are coated by the hot melt coating. However, the connection portion connecting the FPC substrate 28 and the strain gauges G1, G2 may be coated by a normal protective coating using polyamide or polyester resin.

In order to resolve the aforementioned issue, the technical measure is taken by configuring the occupant load sensor for the vehicle 10 as follows. The occupant load sensor for the vehicle 10 includes the strain member 20 adapted to be fixed at both ends at the fixing surface 18 provided at one of the upper rail 16 and the frame 17 with the predetermined distance from the fixing surface 18 in a vertical direction of the seat 11, the connecting shaft 23 vertically fixed at the center of the strain member 20 and adapted to be fixed at the other one of the upper rail 16 and the frame 17, the strain gauges G1, G2 attached to the surface of the strain member 20 between each of the ends and the center of the Strain member 20, the upper bracket 24 having the fixed portions 43, 44 at each end thereof fixed to the back surface of the strain member 20 at the both end and the attachment portion 47 connecting each fixed portion 43, 44 and extending at a side of the strain member 20 in the lateral direction of the seat 11, the amplifier case 27 attached to the attachment portion 47 of the upper bracket 24 and arranged in parallel with the strain member 20, the amplifier substrate 26 enclosed in the amplifier case 27 and placed on an identical plane to the surface of the strain member 20 for amplifying the signal transmitted from the strain gauge 20, the FPC substrate 28 connected to the strain gauges G1, G2 between each of the end and the center of the strain member 20 and connected to the amplifier substrate 26, the coating portion 55 made of resin for coating the connection portions 53, 54 between the FPC substrate 28 and the strain gauge G1, G2 and a low pressure molded portion 47 made of resin and molded with a hot melt resin by low pressure molding in the amplifier case 27 so as to cover the amplifier substrate 26 and the connection portions 53, 54 between the FPC substrate 28 and the strain gauges G1, G2.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An occupant load sensor for a vehicle, comprising:
   a strain member adapted to be fixed at both ends at a fixing surface provided at one of a floor side fixing member and a seat side fixing member with a predetermined distance from the fixing surface in a vertical direction of a seat;
   a connecting member vertically fixed at a center of the strain member, the connecting member adapted to be fixed at the other one of the floor side fixing member and the seat side fixing member;
   a strain gauge attached to a surface of the strain member between each of the ends and the center of the strain member;
   an upper bracket having a fixed portion at each end thereof fixed to a back surface of the strain member at the both end and an attachment portion connecting the each fixed portion and extending at a side of the strain member in a lateral direction of the seat;
   an amplifier case attached to the attachment portion of the upper bracket and arranged in parallel with the strain member;
   an amplifier substrate enclosed in the amplifier case and placed on an identical plane to the surface of the strain member for amplifying a signal transmitted from the strain gauge;
   an FPC substrate connected to the strain gauge between each of the ends and the center of the strain member and connected to the amplifier substrate;
   a coating portion made of resin for coating a connection portion between the FPC substrate and the strain gauge; and
   a low pressure molded portion made of resin, the low pressure molded portion molded with a hot melt resin by low pressure molding in the amplifier case so as to cover the amplifier substrate and the connection portion between the FPC substrate and the strain gauge.

2. An occupant load sensor for a vehicle according to claim 1, further comprising:
   lower brackets fixed to the fixing surface formed at the one of the floor side fixing member and the seat side fixing member at a position corresponding to the both end of the strain member, each lower bracket including:
      a base portion having an identical thickness to the predetermined distance; and
      a shaft portion protruding from the base portion and penetrating through the end of the strain member to be pressed into the fixed portion of the upper bracket, the shaft portion supportively interposed the strain member with the one of the floor side fixing member and the seat side fixing member,
   wherein the strain member is fixed to the fixing surface with the predetermined distance therefrom by the lower brackets.

3. An occupant load sensor for a vehicle according to claim 1, wherein the amplifier case is made of resin.

4. An occupant load sensor for a vehicle according to claim 1, wherein the upper bracket extends at the side of the strain member in the lateral direction of the seat so as not to be overlapped with the strain member except the fixed portions at the both ends thereof.

5. An occupant load sensor for a vehicle according to claim 1, wherein when the strain member is fixed to the fixing surface formed at the one of the floor side fixing member and the seat side fixing member at the both end thereof with the predetermined distance from the fixing surface, the amplifier case is located away from the floor side fixing member and the seat side fixing member.

6. An occupant load sensor for a vehicle according to claim 1, wherein the coating portion is molded by hot melt coating.

* * * * *